US 6,651,477 B2

(12) United States Patent
Humphries et al.

(10) Patent No.: US 6,651,477 B2
(45) Date of Patent: *Nov. 25, 2003

(54) PROCESS FOR FORMING TUBULAR COMPONENTS

(75) Inventors: Peter Humphries, Bridgnorth (GB); Alexander Mark Duff, Hortons Chapel (GB); Simon Jonathan Giles Griffiths, Solihull (GB)

(73) Assignee: GKN Autostructures Limited, Telford (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1 day.

(21) Appl. No.: 09/368,775

(22) Filed: Aug. 5, 1999

(65) Prior Publication Data

US 2002/0005058 A1 Jan. 17, 2002

(30) Foreign Application Priority Data

Aug. 7, 1998 (GB) .............................................. 9817112

(51) Int. Cl.⁷ ............................................... B21D 41/02
(52) U.S. Cl. .................................. 72/370.06; 72/370.26
(58) Field of Search ......................... 72/370.06, 370.26, 72/FOR 101, 316, 318

(56) References Cited

U.S. PATENT DOCUMENTS

| | | | | | |
|---|---|---|---|---|---|
| 1,935,714 | A | * | 11/1933 | Hummell | 72/316 |
| 2,506,657 | A | * | 5/1950 | Webster | 72/356 |
| 2,739,376 | A | * | 3/1956 | Peet | 72/370.06 |
| 3,838,591 | A | * | 10/1974 | Ross | 72/318 |
| 4,063,439 | A | * | 12/1977 | Besson | 72/370.06 |
| 4,843,860 | A | * | 7/1989 | Gray | 72/370.06 |
| 4,926,667 | A | * | 5/1990 | Markiewicz et al. | 72/370.06 |

* cited by examiner

Primary Examiner—Lowell A. Larson
(74) Attorney, Agent, or Firm—Louis J. Bovasso; Greenberg Traurig LLP

(57) ABSTRACT

A process of producing from an elongate tube a tubular structural component having a first longitudinal section integrally connected to a second longitudinal section, the second section being located at the end of the tube and being of a desired cross-sectional shape and size, the cross-sectional size of the second section being greater than that of the first section, the process including selecting a mandrel having a cross-sectional shape and size corresponding to the second section, relatively axially feeding said end of the tube over the mandrel in order to form said second section, the choice of the size of mandrel and the rate of feed and the axial pressure applied to said tube being controlled such that the wall thickness of the second section is on average at least 70 percent of the average wall thickness of the first wall section.

10 Claims, 5 Drawing Sheets

PROCESS FOR FORMING TUBULAR COMPONENTS

The present invention relates to a process for forming tubular components and to products produced by the process.

For the mass-production of tubular components, for example structural tubular components used in the construction of a motor vehicle body, it is desirable to reproduce individual components within reproducible close tolerances whilst maintaining the cost of manufacture as low as possible. As a structural component, it is necessary that the component be manufactured so as to be capable of withstanding working loads in order to provide the desired amount of structural support. It is important therefore that the production process does not introduce undesirable weaknesses into the finished tubular component.

Typically a structural tubular component as used in the construction of a motor vehicle body will be generally elongate and will have length portions which vary in cross-sectional shape and/or size.

Some of these types of components can be formed from a precursor tube of constant cross-sectional shape and size along its length, the precursor tube being worked upon by forming processes such as hydroforming in order to change the shape and size of the precursor tube at predetermined locations along its length.

The forming process may involve several separate forming stages before the final component is produced. Each forming stage adds cost to the overall cost of producing the component and also slows down the overall process. It is also possible that each forming stage introduces weaknesses into the formed material.

It is known for example that when using hydroforming techniques, particularly at low temperatures, the amount by which the tubular component can be expanded is relatively restricted and so if the final component includes length sections of relative large differences in cross-sectional dimension, it is known to produce the precursor tube from separate relative small and large tubular sections which are joined together prior to the forming process.

A general aim of the present invention is to provide a relatively simple process for the expansion of a precursor tube so as to provide a formed tube having integrally joined longitudinal sections of relatively small and large cross-sectional dimensions, the formed tube defining an intermediate precursor tube for subsequent forming processes or defining the finished tubular component.

According to one aspect of the present invention there is provided a process of producing from an elongate tube a tubular structural component having a first longitudinal section integrally collected to a second longitudinal section, the second section being located at the end of the tube and being of a desired cross-sectional shape and size, the cross-sectional size of the second section being greater than that of the first section, the process including selecting a mandrel having a cross-sectional shape and size corresponding to the second sections relatively axially feeding said end of the tube over the mandrel in order to form said second section, the choice of the size of mandrel and the rate of feed and the axial pressure applied to said tube being controlled such that the wall thickness of the second section is on average at least 70 percent of the average wall thickness of the first wall section.

According to another aspect of the present invention there is provided a structural component having been formed at least in part by the process defined above.

Various aspects of the present invention are hereinafter described, with reference to the accompanying drawings, in which.

Figure 1:
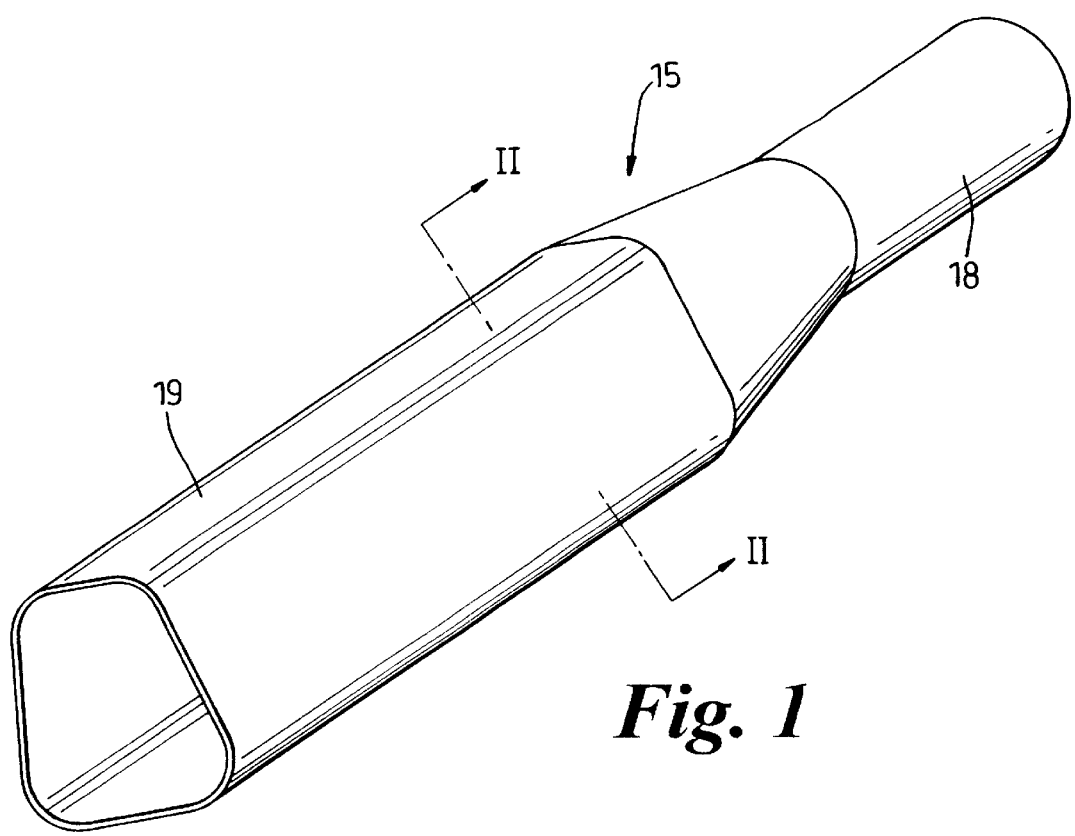
FIG. 1 is a schematic perspective end view of a structural component formed by the process of the present inventions.
Figure 2:
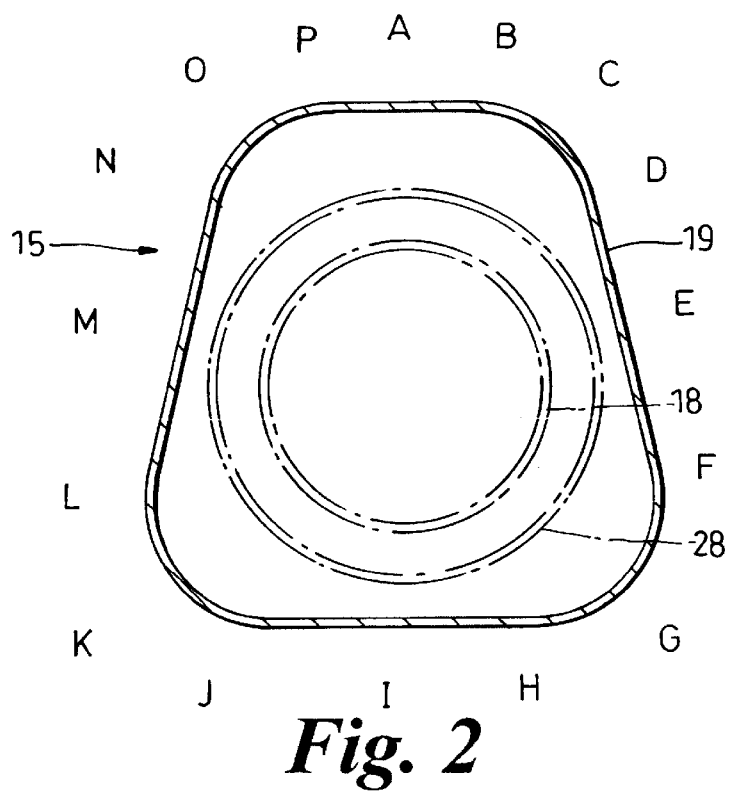
FIG. 2 is a sectional view of the component shown in FIG. 1 taken along line II—II.
Figure 3A:
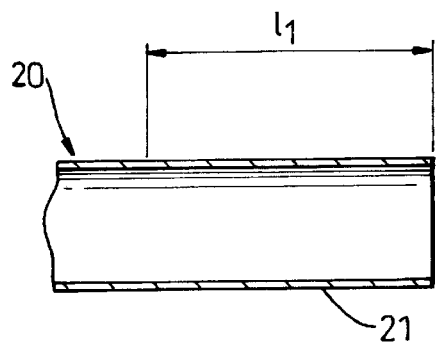
FIGS. 3a to 3c are schematic illustrations of a forming process according to a first embodiment of the present invention.
Figure 3A:
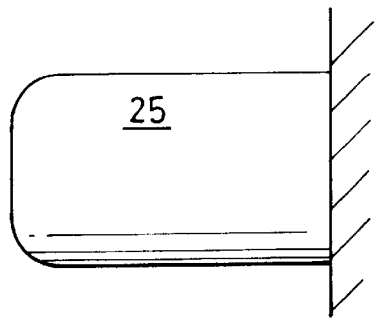
Figure 3B:
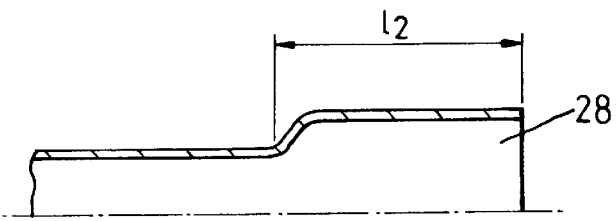
Figure 3B:
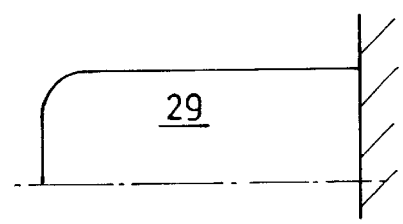
Figure 3C:
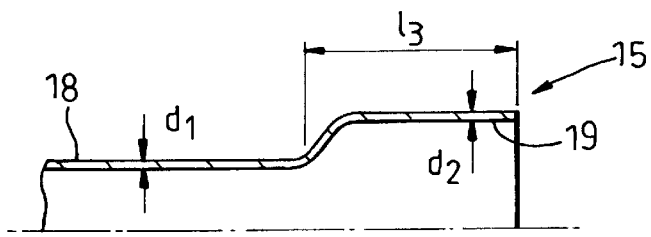

In FIGS. 1 and 2 there is shown a tubular structural component 15 according to the present invention which as illustrated in FIGS. 3a to 3c is formed by a two stage process.

The tubular component 15 formed by the present process includes a first longitudinal section 18 which is integrally connected to a second longitudinal section 19. The cross-sectional dimensions of the second longitudinal section 19 are greater than the cross-sectional dimensions of the first section 18.

As illustrated in FIG. 3a, tubular component 15 is formed from a precursor tube 20 which is preferably of constant cross-sectional shape and size along its length. In the illustrated example, an end of the tube 20 is subjected to successive forming operations (FIGS. 3a, 3b) to create the second section 19; the first section 18 preferably comprising a length of the precursor tube 20 which has not been subjected to the forming operations.

The forming operation in the first stage (FIG. 3a) comprises forcing the end section 21 (having a length $l_1$) of tube 20 axially over a mandrel 25. Typically this is done by gripping the tube 20 and driving it axially over a static mandrel. It will be appreciated that as an alternative the tube may be gripped so as to be static and the mandrel be axially driven into the tube.

This creates an enlarged end section 28 having a length $l_2$. As illustrated in FIG. 2, the end section 28 is conveniently formed so as to be of circular section.

The enlarged end section 28 is subsequently forced axially over a second, larger mandrel 29 to create the desired second length section 19; this has an axial length of $l_3$. The cross-sectional sizes of mandrels 25, 29 are chosen bearing in mind the yield capability of the material from which tube 20 is formed.

These sizes are chosen such that the material when being stretched over the mandrels 25, 29 is not exposed to strain forces which would cause the material to exceed its yield strength.

Figure 5:
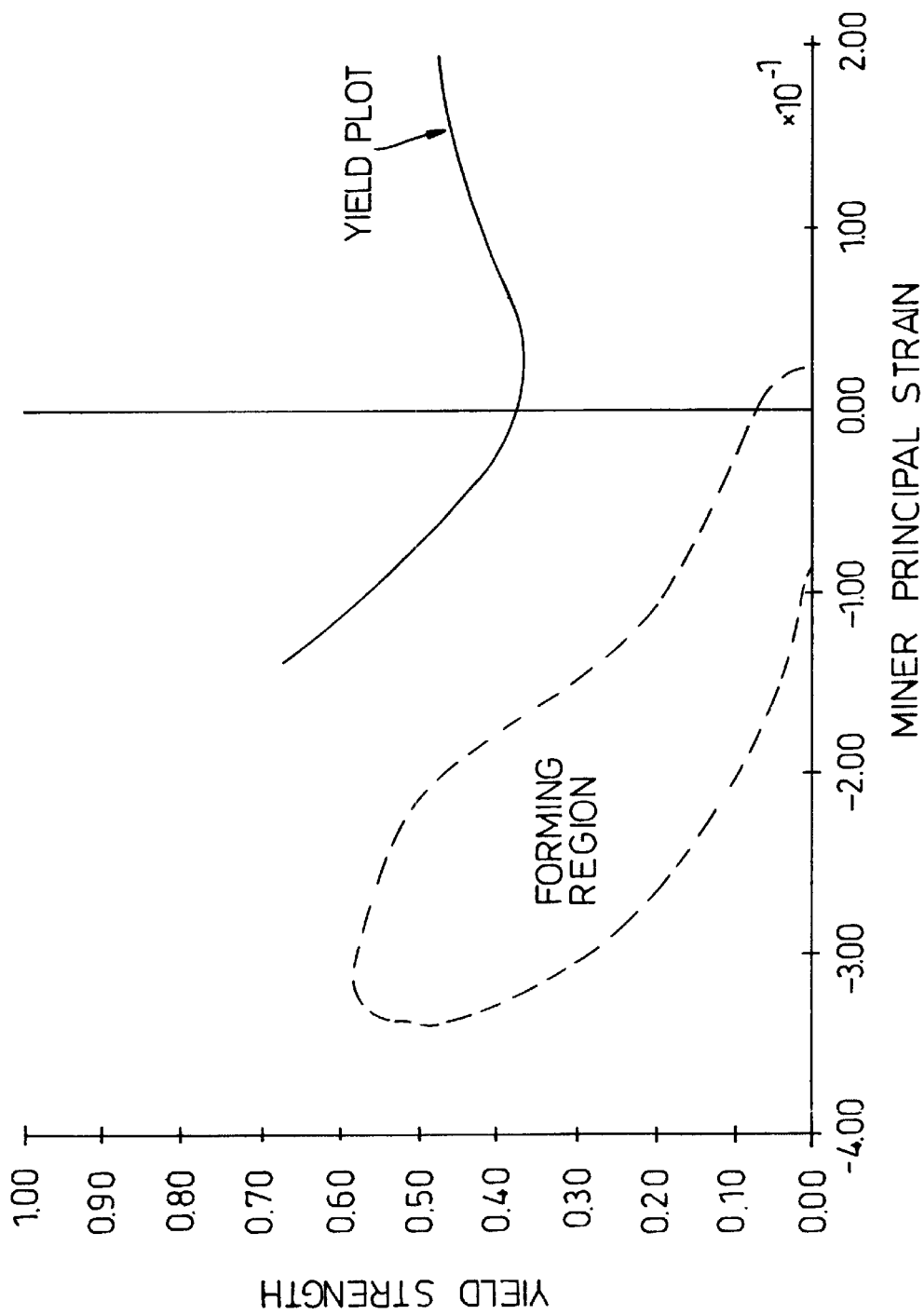
FIG. 5 is a CAE analysis graph of a component formed according to the process of the first embodiment.

In addition, the axial force applied at each stage for forcing the tube over each mandrel 25, 29 and also the rate of feed over each mandrel 25, 29 is chosen such that, within the material being formed, the strain in the axial direction of the tube (minor principal strain in FIG. 5) and the strain in the circumferential direction of the tube (major principal strain in FIG. 5) are controlled such that the thickness of the tube after forming is substantially the same as that prior to forming. As indicated in FIG. 5, this is achieved by controlling the minor principal strain so as to be preferably neutral or negative whilst controlling the major principal strain to be neutral or positive.

Figure 4:
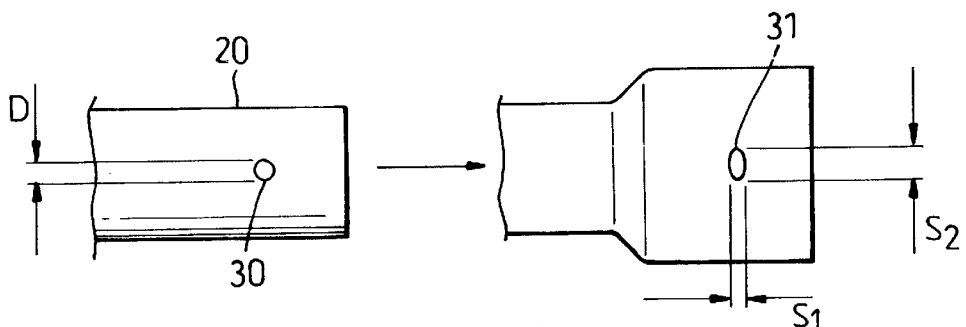
FIG. 4 is a diagrammatic illustration indicating the flow of material during the forming process.

Measurement of the major and minor principal strains is demonstrated in FIG. 4. This is achieved by marking circles 30 of known diameter D at desired locations on the tube 20 prior to forming, and then measuring the distortion of each marked circle 30 after the forming operation. In FIG. 4, the circle 30 is illustrated as being distorted to form an ellipse 31.

Measurement of the distortion is taken in the minor axis (axial direction of the tube) and the major axis (circumferential direction of the tube) for each circle 30.

In the illustration of FIG. 4, the size $S_1$ of the ellipse in the minor axis is less than the diameter D and so provides a negative strain value whereas the size $S_2$ of the ellipse in the major axis is greater than the diameter D and so provides a positive strain value.

A typical distribution of these measured values (referred to as forming analysis) is illustrated in the graph of FIG. 5, wherein the strain distortion values for various locations on the tubular component 15 of FIG. 1 are plotted.

The yield strength of the material is also plotted on the graph of FIG. 5 to demonstrate that the strain values are maintained substantially below (preferably less than 50%) of the yield strength of the material.

By controlling the choice of the size of mandrels 25, 29, the axial force applied for forcing the tube over the mandrels and the rate of feed of the tube it is possible to control the flow of material during the forming process to achieve the desired neutral/negative strain in the minor direction combined with the desired strain in the major direction.

In view of this control, the material tends to flow in the axial direction of the tube (under a compressive force) and so tends to thicken the wall thickness of the tube; at the same time material also flows in the circumferential direction of the tube (under a drawing force) and so tends to thin the wall of the tube. The degree of the control is adjusted such that the resultant wall thickness of the second section 19 is substantially the same as that of the first section 18. In this way the tubular component maintains a consistency of strength along its length and is able to function as a load bearing structural member.

Preferably the process control results in the average wall thickness $d_2$ of the second section 19 being at least 70% of the average wall thickness $d_1$ of the first section 18; more preferably $d_2$ is at least 80% of $d_1$.

Due to the flow of material under compression in the axial direction, the relationship $l_1 > l_2 > l_3$ is experienced.

In the example illustrated in FIGS. 3a to 3c there are two successive forming stages. It will be appreciated that there may be more than two successive forming stages if desired.

It has been discovered that when the cross-sectional shape of the formed section is non-circular, eg. it is defined by flat sections connected by corners, (for example the polygonal shape of section 19 shown in FIG. 2), there is a tendency for the wall thickness in the flat sections to be greater than at the corners.

This is demonstrated by reference to FIG. 2 and the table below which lists the wall thicknesses (in mm) with respect to the original thickness (t) in section 19 at the locations referenced A to P. The original wall thickness (t) of tube 20 from which section 19 has been formed is about 2 mm.

| POS | ACT |
|-----|-------|
| A | t-0.12 |
| B | t-0.16 |
| C | t-0.21 |
| D | t-0.14 |
| E | t-0.09 |
| F | t-0.12 |
| G | t-0.21 |
| H | t-0.30 |
| I | t-0.10 |
| J | t-0.30 |
| K | t-0.25 |
| L | t-0.42 |
| M | t-0.14 |
| N | t-0.20 |
| O | t-0.19 |
| P | t-0.17 |

Figure 6:
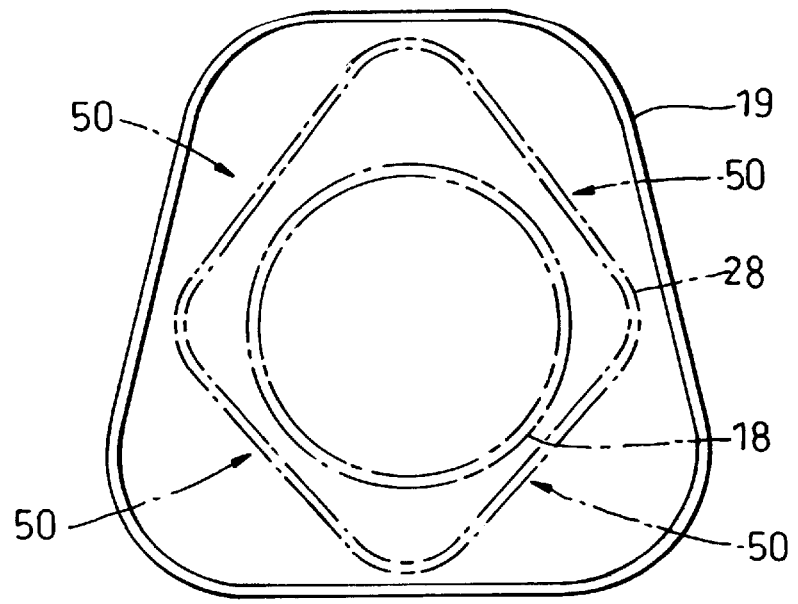
FIG. 6 is an end view similar to FIG. 2 showing a modified forming stage.

Accordingly as schematically illustrated in FIG. 6, it is envisaged that enlarged section 28 may be formed into a polygonal shape having flat sections 50 corresponding to where corners in the final second section 19 are to be located. This provides additional wall thickness at these regions when forming over mandrel 29 to compensate for expected wall thinning at the corners of section 19.

It is envisaged that the second section 18 may be subsequently processed by other shaping processes, for example by hydro-forming processes.

The type of material and the wall thickness of the tube 20 is chosen bearing in mind the strength and use requirements of the finished component. It is envisaged that steel such as HSLA steel or CARBON-MANGANESE steel would be suitable for use in motor vehicle bodies.

The tube 20 may be formed by cold drawing or may be rolled and seam welded.

Figure 7:
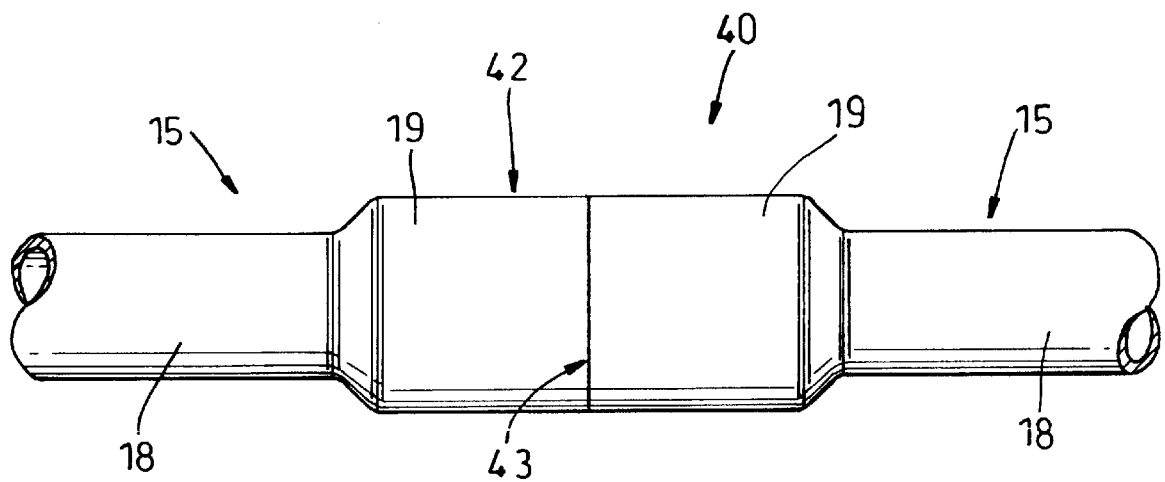
FIG. 7 is a schematic side view of a composite tubular component according to an embodiment of the present invention.

It is also envisaged that two tubular components 15 may be joined end to end in order to provide a composite tubular component 40 (FIG. 7) having an enlarged length section 42 intermediate its opposite ends.

The two tubular components 15 are joined by a joint 43 which may be formed in any known manner, eg. it may be a simple butt joint whereat the ends are bonded or welded together.

Figure 8:
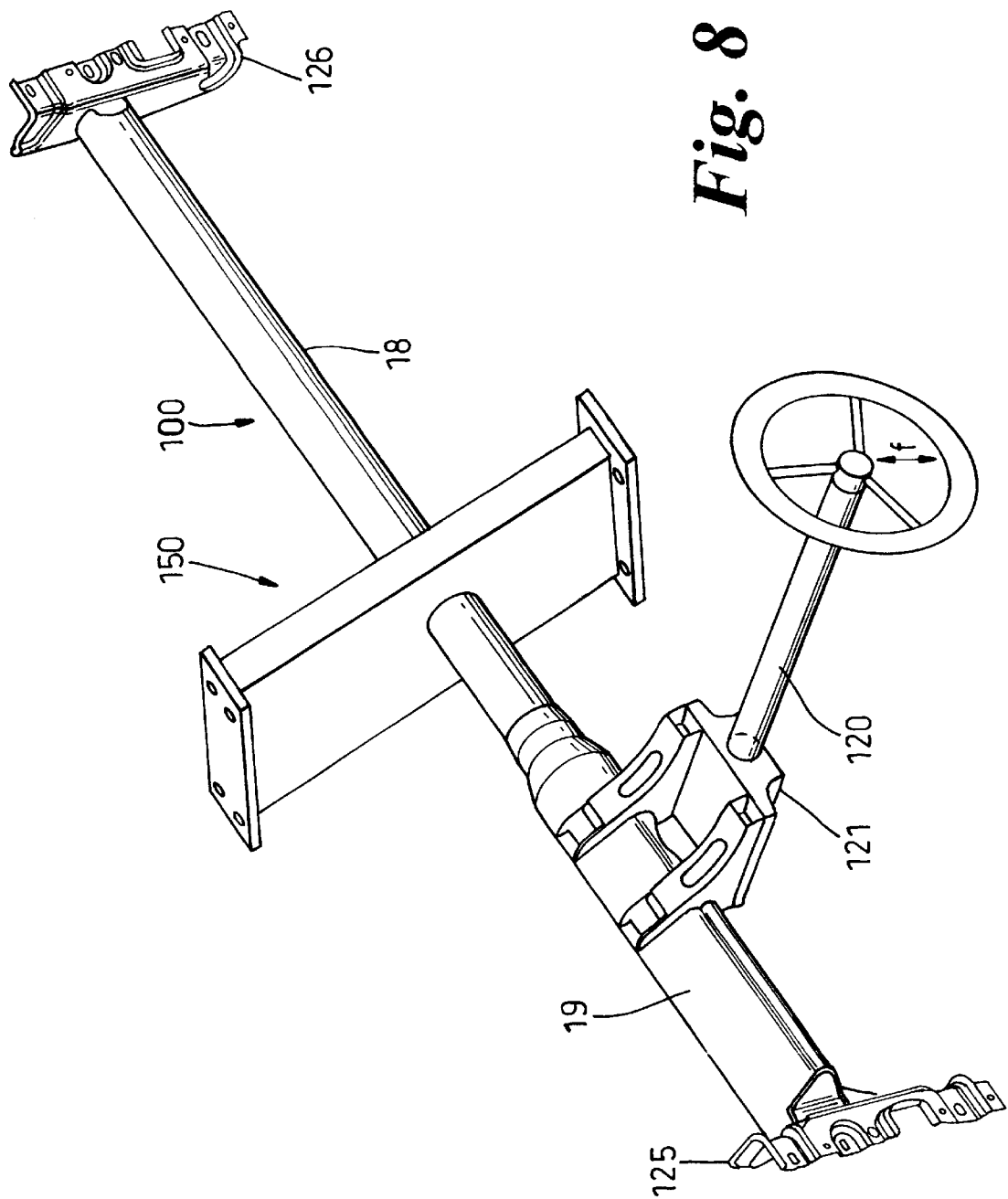
FIG. 8 is a more detailed perspective end view of the component of FIG. 1 shown in situ in a vehicle body.

An example of a specific tubular component 100 formed in accordance with the present invention is illustrated in FIG. 8.

The tubular component 100 comprises a cross-beam in a vehicle body on which a steering wheel 120 is mounted by brackets 12.

The component 100 has an enlarged second section 19 at one end which is secured by a bracket 125 to one side of the vehicle. The remainder of the component 100 comprises the first section 18 which is of circular cross-section and of constant size along its length. This enables the component 100 to extend across the vehicle body whilst occupying a minimum of space. The free end of the first section 18 is provided with a bracket 126 for securance to the opposite side of the vehicle.

In the embodiment illustrated in FIG. 8, the section 18 is circular and about 60 mm outer diameter having a wall thickness of around 2 mm, the preferred material being HSLA steel. The cross-sectional shape of section 19 is similar to that shown in FIG. 2.

A main mounting frame is located midway along tubular component 100 the upper end of frame 150 is attached to the bull head (not shown) of the vehicle body and is attached at its lower end to the transmission tunnel (not shown) of the vehicle body. The component 100 is fixedly connected to the frame 150 for example by welding.

Accordingly, second section 19 of component 100 is rigidly held between the side of the vehicle body and frame 150.

The construction of cross-beams for the mounting of steering wheels has a functional affect on the NVH (Noise Vibration Harshness) performance of the steering wheel. The NVH performance is important in motor vehicle body construction since it materially affects the feel of steering wheel, ie. vibrations in the steering wheel can be felt under certain circumstances such as idling of an engine or at certain speeds of the vehicle.

In order to reduce such vibrations to a minimum, it is desirable to design the cross-beam to have a NVH value such that vibration frequencies (f) for the steering wheel are above a predetermined frequency value, typically 30–40 Hz.

It will be appreciated that, since the component 100 of the present invention is formed from a precursor tube 20 and appropriately shaped mandrels, it is a relatively inexpensive exercise to change either the cross-sectional shape/dimension of the second section 19 by appropriate selection of mandrel or to change the wall thickness of the second section 19 by appropriate choice for the wall thickness of the precursor tube 20. Accordingly, it is a relatively simple exercise to adjust the structure of the component 100 in order to improve the NVH performance.

What is claimed is:

1. A process of producing from an elongate tube a tubular structural support component having a first longitudinal section integrally connected to a second longitudinal section, the second section being located at the end of the tube and being of a desired cross-sectional shape and size, the cross-sectional size of the second section being greater than that of the first section, the process including an elongate tube formed from steel selecting a mandrel having a cross-sectional shape and size corresponding to the second section, relatively axially feeding said end of the tube over the mandrel with the tube or mandrel being held in a static condition in order to form said second section, the choice of the size of mandrel and the rate of feed and the axial pressure applied to said tube being controlled such that the wall thickness of the second section is on average at least 70 percent of the average wall thickness of the first wall section. the control of said feeding of the tube and the selection of the size of mandrel also being such that material flow in the tube forming the second section produces a neutral or negative strain in the axial direction of the tube and a neutral or positive strain in the circumferential direction of the tube with the strain values being less than the yield strength of the steel from which the tube is formed.

2. A process of producing from an elongate tube a tubular structural support component having a first longitudinal section integrally connected to a second longitudinal section, the second section being located at the end of the tube and being of a desired cross-sectional shape and size, the cross-sectional size of the second section being greater than that of the first section, the process including an elongate tube formed from steel, selecting a mandrel having a cross-sectional shape and size corresponding to the second section, relatively axially feeding said end of the tube over the mandrel with the tube or mandrel being held in a static condition in order to form said second section, the controlled rate of feed and the axial pressure applied to said tube being effective to form thickness in said second section on average at least 70 percent of the average wall thickness of the first wall section, the control of said feeding of the tube and the selection of the size of mandrel also being such that material flow in the tube forming the second section produces a neutral or negative strain in the axial direction of the tube and a neutral or positive strain in the circumferential direction of the tube with the strain values being less than the yield strength of the steel from which the tube is formed, said second longitudinal section being formed by successively relatively axially feeding said end over successive mandrels each having a different shape to the previously used mandrel, the second longitudinal section being of polygonal shape having flat regions connected by corners, the process including an intermediate mandrel immediately prior to the mandrel for forming the polygonal shape of the second section, said intermediate mandrel creating a polygonal shape having flat sections corresponding to where said corners of the second section are to be located.

3. A process according to claim 2 wherein said strain values are preferably less than 50% of the yield strength of the steel which said tube is formed.

4. A tubular component produced by the process according to claim 2.

5. A process of producing from an elongate tube a tubular structural support component having a first longitudinal section integrally connected to a second longitudinal section, the second section being located at the end of the tube and being of a desired cross-sectional shape and size, the cross-sectional size of the second section being greater than that of the first section, the process including an elongate tube formed from steel, selecting a mandrel having a cross-sectional shape and size corresponding to the second section, relatively axially feeding said end of the tube over the mandrel with the tube or mandrel being held in a static condition in order to form said second section, the controlled rate of feed and the axial pressure applied to said tube being effective to form wall thickness in said second section on average at least 70 percent of the average wall thickness of the first wall section, said second longitudinal section being formed by successively relatively axially feeding said end over successive mandrels each having a different shape to the previously used mandrel, the second longitudinal section being of polygonal shape having flat regions connected by corners, the process including an intermediate mandrel immediately prior to the mandrel for forming the polygonal shape of the second section, said intermediate mandrel creating a polygonal shape having flat sections corresponding to where said corners of the second section are to be located.

6. A process according to claim 5 wherein the control of the feeding of the tube and the selection of the size of mandrel is such that the average material thickness of the second section is at least 80 percent of the average wall thickness of the second section.

7. A process according to claim 5 wherein said second longitudinal section is formed by successively relatively axially feeding said end over successive mandrels each having a different shape to the previously used mandrel.

8. A process according to claim 5 wherein said elongate tube is formed by cold drawing.

9. A process according to claim 5 wherein said elongate tube is formed by rolling and seam welding.

10. A tubular component produced by the process according to claim 5.

* * * * *